(12) United States Patent
Kim et al.

(10) Patent No.: US 9,195,029 B2
(45) Date of Patent: Nov. 24, 2015

(54) OPTICAL SYSTEM

(71) Applicant: SAMSUNG ELECTRO-MECHANICS CO., LTD., Suwon-si (KR)

(72) Inventors: Jin Sung Kim, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 31 days.

(21) Appl. No.: 14/185,792

(22) Filed: Feb. 20, 2014

(65) Prior Publication Data

US 2015/0062721 A1   Mar. 5, 2015

(30) Foreign Application Priority Data

Aug. 29, 2013 (KR) .......................... 10-2013-0103368

(51) Int. Cl.
  *G02B 13/18* (2006.01)
  *G02B 9/62* (2006.01)
  *G02B 13/00* (2006.01)

(52) U.S. Cl.
  CPC .............. *G02B 13/0045* (2013.01); *G02B 9/62* (2013.01); *G02B 13/18* (2013.01)

(58) Field of Classification Search
  CPC ..................................................... G02B 13/0045
  See application file for complete search history.

(56) References Cited

U.S. PATENT DOCUMENTS

| | | | |
|---|---|---|---|
| 2013/0120858 A1 | 5/2013 | Sano | |
| 2014/0078603 A1* | 3/2014 | You | 359/738 |
| 2015/0049393 A1* | 2/2015 | Park | 359/713 |
| 2015/0055229 A1* | 2/2015 | Park et al. | 359/757 |
| 2015/0116843 A1* | 4/2015 | Jo | 359/713 |
| 2015/0131167 A1* | 5/2015 | Park et al. | 359/713 |
| 2015/0131172 A1* | 5/2015 | Park et al. | 359/759 |

FOREIGN PATENT DOCUMENTS

| | | |
|---|---|---|
| KR | 10-2012-0135648 | 12/2012 |
| KR | 10-2013-0039758 | 4/2013 |
| WO | 2012/169778 A2 | 12/2012 |

\* cited by examiner

*Primary Examiner* — David N Spector
(74) *Attorney, Agent, or Firm* — NSIP Law (57) ABSTRACT

An optical system may include: a first lens having positive refractive power; a second lens having positive refractive power; a third lens having negative refractive power; a fourth lens having positive refractive power; a fifth lens having negative refractive power; a sixth lens having positive or negative refractive power, an image-side surface thereof being concave toward an imaging surface.

23 Claims, 4 Drawing Sheets

OPTICAL SYSTEM

CROSS-REFERENCE TO RELATED APPLICATION

This application claims the benefit of Korean Patent Application No. 10-2013-0103368 filed on Aug. 29, 2013, with the Korean Intellectual Property Office, the disclosure of which is incorporated herein in its entirety by reference.

BACKGROUND

The present technology generally relates to an optical system.

Mobile communications terminals commonly include camera modules so that video calls and image capturing are possible. In addition, as functions of camera modules included in mobile communications terminals have gradually increased, cameras for mobile communications terminals have been gradually required to have high degrees of resolution and high levels of performance.

However, since there is a trend for mobile communications terminals to be miniaturized and lightened, there is a limitation in implementing camera modules having high degrees of resolution and high levels of performance.

In order to solve these problems, recently, lenses within such camera modules have been formed of plastic, a substance lighter than glass, and a lens module has been configured using five or more lenses in order to implement high degrees of resolution.

However, in the case of using such lenses, improvements of chromatic aberration may be problematic and it may be relatively more difficult to implement a relatively bright optical system using lenses formed of plastic than lenses formed of glass.

SUMMARY

Some embodiments of the present disclosure may provide an optical system capable of improving an aberration improvement effect, implementing high degrees of resolution, and improving sensitivity of lenses.

According to some embodiments of the present disclosure, an optical system may include: a first lens having positive refractive power; a second lens having positive refractive power; a third lens having negative refractive power; a fourth lens having positive refractive power; a fifth lens having negative refractive power; a sixth lens having positive or negative refractive power, an image-side surface thereof being concave toward an imaging surface.

An object-side surface of the first lens may be convex toward an object.

An image-side surface of the second lens may be convex.

An object-side surface of the third lens may be concave.

The fourth lens may have a meniscus shape convex toward the imaging surface.

An object-side surface of the fifth lens may be convex, and an image-side surface thereof may be concave.

The fifth lens may have an inflection point formed on an object-side surface or an image-side surface thereof.

The sixth lens may have at least one inflection point formed on the image-side surface thereof.

The first to sixth lenses may be formed of plastic.

At least one of an object-side surface and an image-side surface of each of the first to sixth lenses may be aspherical.

The optical system may satisfy Conditional Equation 1:

$$0.6 < f1/f < 1.1 \qquad \text{[Conditional Equation 1]}$$

where f is an overall focal length [mm] of the optical system, and f1 is a focal length [mm] of the first lens.

The optical system may satisfy Conditional Equation 2:

$$|v2-v3| > 25 \qquad \text{[Conditional Equation 2]}$$

where v2 is an abbe number of the second lens, and v3 is an abbe number of the third lens.

The optical system may satisfy Conditional Equation 3:

$$0.8 < f2/f < 2.0 \qquad \text{[Conditional Equation 3]}$$

where f2 is a focal length [mm] of the second lens, and f is an overall focal length [mm] of the optical system.

The optical system may satisfy Conditional Equation 4:

$$-1.2 < f3/f < -0.6 \qquad \text{[Conditional Equation 4]}$$

where f3 is a focal length [mm] of the third lens, and f is an overall focal length [mm] of the optical system.

The optical system may satisfy Conditional Equation 5:

$$1 < f4/f < 8 \qquad \text{[Conditional Equation 5]}$$

where f4 is a focal length [mm] of the fourth lens, and f is an overall focal length [mm] of the optical system.

The optical system may satisfy Conditional Equation 6:

$$-12 < f5/f < -1 \qquad \text{[Conditional Equation 6]}$$

where f5 is a focal length [mm] of the fifth lens, and f is an overall focal length [mm] of the optical system.

The optical system may satisfy Conditional Equation 7:

$$1.0 < OAL/f < 1.8 \qquad \text{[Conditional Equation 7]}$$

where OAL is a distance [mm] from an object-side surface of the first lens to an imaging surface, and f is an overall focal length [mm] of the optical system.

The optical system may satisfy Conditional Equation 8:

$$0.2 < f1/f2 < 0.8 \qquad \text{[Conditional Equation 8]}$$

where f1 is a focal length [mm] of the first lens, and f2 is a focal length [mm] of the second lens.

The optical system may satisfy Conditional Equation 9:

$$-2.0 > f2/f3 < -0.8 \qquad \text{[Conditional Equation 9]}$$

where f2 is a focal length [mm] of the second lens, and f3 is a focal length [mm] of the third lens.

The optical system may satisfy Conditional Equation 10:

$$0.1 < BFL/f < 0.6 \qquad \text{[Conditional Equation 10]}$$

where BFL is a distance [mm] from an image-side surface of the sixth lens to an imaging surface, and f is an overall focal length [mm] of the optical system.

The optical system may satisfy Conditional Equation 11:

$$0.0 < D1/f < 0.1 \qquad \text{[Conditional Equation 11]}$$

where D1 is an air interval [mm] between the first and second lenses, and f is an overall focal length [mm] of the optical system.

The optical system may satisfy Conditional Equation 12:

$$0.2 < r1/f < 1.0 \qquad \text{[Conditional Equation 12]}$$

where r1 is a radius of curvature [mm] of an object-side surface of the first lens, and f is an overall focal length [mm] of the optical system.

The optical system may satisfy Conditional Equation 13:

$$-0.9 < r4/f < -0.1 \qquad \text{[Conditional Equation 13]}$$

where r4 is a radius of curvature [mm] of an image-side surface of the second lens, and f is an overall focal length [mm] of the optical system.

BRIEF DESCRIPTION OF DRAWINGS

Embodiments of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In the following lens configuration diagrams, thicknesses, sizes, and shapes of lenses have been slightly exaggerated for convenience of explanation. Particularly, a shape of a spherical surface or an aspherical surface shown in the lens configuration diagrams has been shown only by way of example. That is, the spherical surface or the aspherical surface is not limited to having the illustrated shape.

In addition, it is to be noted that a first lens refers to a lens closest to an object, and a sixth lens refers to a lens closest to an imaging surface.

Further, it is noted to be that the term 'front' refers to a direction from the optical system toward an object, while the term 'rear' refers to a direction from the optical system toward an image sensor or an imaging surface. Further, it is to be noted that in each lens, a first surface refers to a surface toward an object (or an object-side surface) and a second surface refers to a surface toward an imaging surface (or an image-side surface). In addition, it is to be noted that the present specification, units of all of numerical values of radii of curvature, thicknesses, OALs, BFLs, and D1 of lenses are in millimeters (mm).

An optical system according to an exemplary embodiment of the present disclosure may include six lenses.

That is, the optical system according to an exemplary embodiment of the present disclosure may include a first lens 10, a second lens 20, a third lens 30, a fourth lens 40, a fifth lens 50, and a sixth lens 60.

However, the optical system according to an exemplary embodiment of the present disclosure is not limited to including only six lenses, but may further include other components if necessary. For example, the optical system may include a stop ST for controlling an amount of light. In addition, the optical system may further include an infrared cut-off filter 70 cutting off infrared light. Further, the optical system may further include an image sensor for converting an image of a subject into an electrical signal. Further, the optical system may further include an interval maintaining member adjusting an interval between lenses.

The first to sixth lenses 10 to 60, configuring the optical system according to an exemplary embodiment of the present disclosure, may be formed of plastic.

In addition, at least one of the first to sixth lenses 10 to 60 may have an aspherical surface. In addition, the first to sixth lenses 10 to 60 may have at least one aspherical surface.

That is, at least one of first and second surfaces of the first to sixth lenses 10 to 60 may be aspherical.

In addition, the optical system including the first to sixth lenses 10 to 60 may have positive refractive power/positive refractive power/negative refractive power/positive refractive power/negative refractive power/positive refractive power or negative refractive power sequentially from an object side.

The optical system configured as described above may improve optical performance through aberration improvement. In addition, the optical system configured as described above may improve sensitivity of the lenses by decreasing a refraction angle. Therefore, in the optical system according to an exemplary embodiment of the present disclosure, all six lenses may be formed of plastic.

The optical system according to an exemplary embodiment of the present disclosure may satisfy Conditional Equation 1.

$$0.6 < f1/f < 1.1 \qquad \text{[Conditional Equation 1]}$$

Here, f is an overall focal length [mm] of the optical system, and f1 is a focal length [mm] of the first lens.

The optical system according to an exemplary embodiment of the present disclosure may satisfy Conditional Equation 2.

$$|v2-v3| > 25 \qquad \text{[Conditional Equation 2]}$$

Here, v2 is an abbe number of the second lens, and v3 is an abbe number of the third lens.

The optical system according to an exemplary embodiment of the present disclosure may satisfy Conditional Equation 3.

$$0.8 < f2/f < 2.0 \qquad \text{[Conditional Equation 3]}$$

Here, f2 is a focal length [mm] of the second lens, and f is the overall focal length [mm] of the optical system.

The optical system according to an exemplary embodiment of the present disclosure may satisfy Conditional Equation 4.

$$-1.2 < f3/f < -0.6 \qquad \text{[Conditional Equation 4]}$$

Here, f3 is a focal length [mm] of the third lens, and f is the overall focal length [mm] of the optical system.

The optical system according to an exemplary embodiment of the present disclosure may satisfy Conditional Equation 5.

$$1 < f4/f < 8 \qquad \text{[Conditional Equation 5]}$$

Here, f4 is a focal length [mm] of the fourth lens, and f is the overall focal length [mm] of the optical system.

The optical system according to an exemplary embodiment of the present disclosure may satisfy Conditional Equation 6.

$$-12<f5/f<-1 \quad \text{[Conditional Equation 6]}$$

Here, f5 is a focal length [mm] of the fifth lens, and f is the overall focal length [mm] of the optical system.

The optical system according to an exemplary embodiment of the present disclosure may satisfy Conditional Equation 7.

$$1.0<OAL/f<1.8 \quad \text{[Conditional Equation 7]}$$

Here, OAL is a distance [mm] from an object-side surface of the first lens to an imaging surface, and f is the overall focal length [mm] of the optical system.

The optical system according to an exemplary embodiment of the present disclosure may satisfy Conditional Equation 8.

$$0.2<f1/f2<1.5 \quad \text{[Conditional Equation 8]}$$

Here, f1 is the focal length [mm] of the first lens, and f2 is the focal length [mm] of the second lens.

The optical system according to an exemplary embodiment of the present disclosure may satisfy Conditional Equation 9.

$$-2.0>f2/f3<-0.8 \quad \text{[Conditional Equation 9]}$$

Here, f2 is the focal length [mm] of the second lens, and f3 is the focal length [mm] of the third lens.

The optical system according to an exemplary embodiment of the present disclosure may satisfy Conditional Equation 10.

$$0.1<BFL/f<0.6 \quad \text{[Conditional Equation 10]}$$

Here, BFL is a distance [mm] from an image-side surface of the sixth lens to the imaging surface, and f is the overall focal length [mm] of the optical system.

The optical system according to an exemplary embodiment of the present disclosure may satisfy Conditional Equation 11.

$$0.0<D1/f<0.1 \quad \text{[Conditional Equation 11]}$$

Here, D1 is an air interval [mm] between the first and second lenses, and f is the overall focal length [mm] of the optical system.

The optical system according to an exemplary embodiment of the present disclosure may satisfy Conditional Equation 12.

$$0.2<r1/f<1.0 \quad \text{[Conditional Equation 12]}$$

Here, r1 is a radius of curvature [mm] of the object-side surface of the first lens, and f is the overall focal length [mm] of the optical system.

The optical system according to an exemplary embodiment of the present disclosure may satisfy Conditional Equation 13.

$$-0.9<r4/f<-0.1 \quad \text{[Conditional Equation 13]}$$

Here, r4 is a radius of curvature [mm] of an image-side surface of the second lens, and f is the overall focal length [mm] of the optical system.

Next, the first to sixth lens 10 to 60 configuring the optical system according to an exemplary embodiment of the present disclosure will be described.

The first lens 10 may have positive refractive power. In addition, both surfaces of the first lens 10 may be convex. For example, a first surface (object-side surface) of the first lens 10 may be convex toward the object, and a second surface (image-side surface) thereof may be convex toward the imaging surface.

At least one of the first and second surfaces of the first lens 10 may be aspherical. For example, both surfaces of the first lens may be aspherical.

The second lens 20 may have positive refractive power. In addition, a second surface of the second lens 20 may be convex toward the imaging surface, and a first surface thereof may be concave or may be convex toward the object.

That is, the first surface of the second lens 20 is not limited to having a specific shape.

At least one of the first and second surfaces of the second lens 20 may be aspherical. For example, both surfaces of the second lens 20 may be aspherical.

The third lens 30 may have negative refractive power. In addition, a first surface of the third lens 30 may be concave. In contrast thereto, a second surface of the third lens 30 may be concave or convex.

At least one of the first and second surfaces of the third lens 30 may be aspherical. For example, both surfaces of the third lens 30 may be aspherical.

The fourth lens 40 may have positive refractive power. In addition, the fourth lens 40 may have a meniscus shape convex toward the imaging surface. In detail, a first surface of the fourth lens 40 may be concave, and a second surface thereof may be convex toward the imaging surface.

At least one of the first and second surfaces of the fourth lens 40 may be aspherical. For example, both surfaces of the fourth lens 40 may be aspherical.

The fifth lens 50 may have negative refractive power. In addition, a first surface of the fifth lens 20 may be convex toward the object, and a second surface thereof may be concave. In addition, the fifth lens 50 may have an inflection point formed on at least any one of the first and second surfaces thereof.

The fifth lens 50 having the above-mentioned shape may be advantageous for concentrating light refracted from the fourth lens 40 on the sixth lens 60. At least one of the first and second surfaces of the fifth lens 50 may be aspherical. For example, both surfaces of the fifth lens 50 may be aspherical.

The sixth lens 60 may have positive or negative refractive power. The sixth lens 60 may have the positive refractive power or have the negative refractive power.

Here, refractive power of the sixth lens 60 may depend on shapes of the second and third lenses 20 and 30. For example, in the case in which both of the first surface of the second lens 20 and the first surface of the third lens 30 are convex toward the object, the sixth lens 60 may have positive refractive power.

However, refractive power of the sixth lens 60 is not limited to the above-mentioned conditions. For example, even in the case in which both of the first surface of the second lens 20 and the first surface of the third lens 30 are convex toward the object, the sixth lens 60 may have negative refractive power.

A first surface of the sixth lens 60 may be convex and a second surface thereof may be concave. In addition, the sixth lens 60 may have an inflection point formed on at least one of the first and second surfaces thereof.

For example, the second surface of the sixth lens 60 may be concave at the center of an optical axis and become convex toward an edge thereof. At least one of the first and second surfaces of the sixth lens 60 may be aspherical. For example, both surfaces of the sixth lens 60 may be aspherical.

In the optical system configured as described above, a plurality of lenses perform an aberration correction function, whereby aberration improvement performance may be improved. In addition, the optical system may improve sensitivity of the lenses by decreasing a refraction angle of the lens. Therefore, in the optical system, all of the lenses may be formed of plastic having optical performance lower than that of glass, whereby costs required for manufacturing a lens module may be decreased and manufacturing efficiency of the lens module may be increased.

Figure 1:
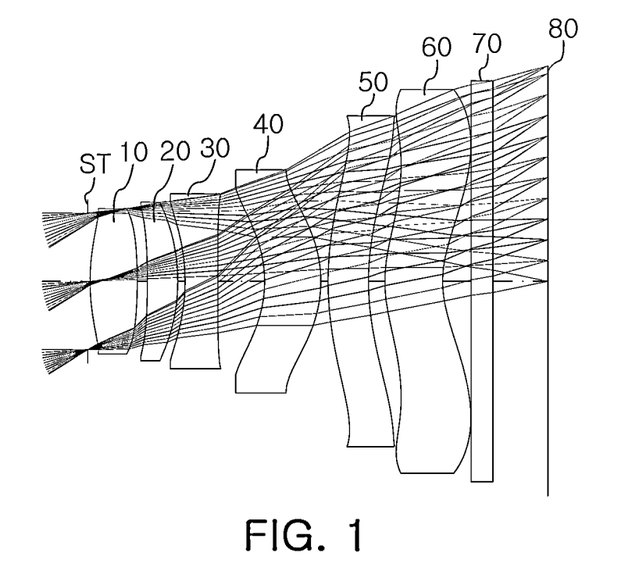
FIG. 1 is a configuration diagram of an optical system according to a first exemplary embodiment of the present disclosure.

An optical system according to a first exemplary embodiment of the present disclosure will be described with reference to FIG. 1.

An optical system according to a first exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 1, a distance (OAL) from a first surface of the first lens 10 to a first surface (imaging surface) of the image sensor 80 may be 6.25 mm, and a distance (BFL) from an image-side surface of the sixth lens 60 to the imaging surface may be 1.43717 mm. In addition, a focal length of the first lens 10 may be 3.89484 mm, a focal length of the second lens 20 may be 6.32828 mm, a focal length of the third lens 30 may be −4.4675 mm, a focal length of the fourth lens 40 may be 28.367 mm, a focal length of the fifth lens 50 may be −44.005 mm, a focal length of the sixth lens 60 may be −35.257 mm, an overall focal length of the optical system may be 4.66679 mm.

TABLE 1

| | |
|---|---|
| f | 4.66679 |
| f1 | 3.89484 |
| f2 | 6.32828 |
| f3 | −4.4675 |
| f4 | 28.367 |
| f5 | −44.005 |
| f6 | −35.257 |
| abbe1 | 56.1138 |
| abbe2 | 56.1138 |
| abbe3 | 25.5917 |
| abbe4 | 56.1138 |
| abbe5 | 56.1138 |
| abbe6 | 56.1138 |
| OAL | 6.25 |
| BFL | 1.43717 |

Other characteristics of lenses (radii of curvature of lenses, thicknesses of lenses, distances between lenses, refractive indices of lenses, abbe numbers of lenses) are shown in Table 2.

TABLE 2

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9415 | 0.645 | 1.547 | 56.1 |
| 3 | −7.1050 | 0.139 | | |
| 4 | −9.9183 | 0.414 | 1.547 | 56.1 |
| 5 | −2.6021 | 0.100 | | |
| 6 | −2.5771 | 0.451 | 1.620 | 25.6 |
| 7 | −39.5869 | 0.636 | | |
| 8 | −1.7029 | 0.767 | 1.547 | 56.1 |
| 9 | −1.7787 | 0.100 | | |
| 10 | 4.4438 | 0.552 | 1.547 | 56.1 |
| 11 | 3.5862 | 0.224 | | |
| 12 | 1.9030 | 0.789 | 1.547 | 56.1 |
| 13 | 1.4782 | 0.387 | | |
| 14 | Infinity | 0.300 | 1.519 | 64.2 |
| 15 | Infinity | 0.752 | | |
| Image | Infinity | −0.002 | | |

In a first exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 3. That is, all of the second surfaces of the first to sixth lenses 10 to 60 may be aspherical.

TABLE 3

| Surface No. 1 | 2 | 3 | 4 | 5 | 6 | 7 | 8 | 9 | 10 | 11 | 12 | 13 |
|---|---|---|---|---|---|---|---|---|---|---|---|---|
| Y radius | 2.941 | −7.105 | −9.918 | −2.602 | −2.577 | −39.587 | −1.703 | −1.779 | 4.444 | 3.586 | 1.903 | 1.478 |
| Conic Constant (K) | 0.000 | 22.379 | 48.410 | −1.297 | 0.000 | 0.000 | −4.087 | −0.583 | −2.016 | −6.136 | −5.134 | −3.967 |
| 4-th Order Coefficient (A) | −0.026 | −0.033 | −0.017 | −0.021 | 0.028 | 0.033 | −0.084 | −0.024 | −0.003 | −0.003 | −0.073 | −0.051 |
| 6-th Order Coefficient (B) | −0.007 | −0.018 | −0.003 | 0.008 | −0.018 | −0.021 | 0.060 | 0.043 | −0.001 | 0.000 | 0.026 | 0.014 |
| 8-th Order Coefficient (C) | −0.042 | −0.030 | −0.026 | −0.016 | 0.012 | 0.011 | −0.020 | −0.015 | 0.000 | 0.000 | −0.006 | −0.003 |
| 10-th Order Coefficient (D) | 0.036 | 0.024 | 0.026 | 0.019 | 0.007 | −0.002 | 0.009 | 0.007 | 0.000 | 0.000 | 0.001 | 0.000 |
| 12-th Order Coefficient (E) | −0.026 | −0.009 | −0.003 | −0.006 | −0.003 | 0.001 | −0.002 | −0.001 | 0.000 | 0.000 | 0.000 | 0.000 |
| 14-th Order Coefficient (F) | 0.001 | 0.000 | 0.000 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 4 that an optical system according to a first exemplary embodiment of the present disclosure satisfies Conditional Equations 1 to 13 described above. Therefore, optical performance of the lens may be improved.

TABLE 4

| | |
|---|---|
| f1/f | 0.835 |
| v2 − v3 | 30.522 |
| f2/f | 1.356 |
| f3/f | −0.957 |
| f4/f | 6.078 |
| f5/f | −9.429 |
| f6/f | −7.555 |
| OAL/f | 1.340 |
| f1/f2 | 0.615 |
| f2/f3 | −1.417 |
| BFL/f | 0.308 |
| D1/f | 0.030 |
| r1/f | 0.630 |
| r4/f | −0.558 |

Figure 2:
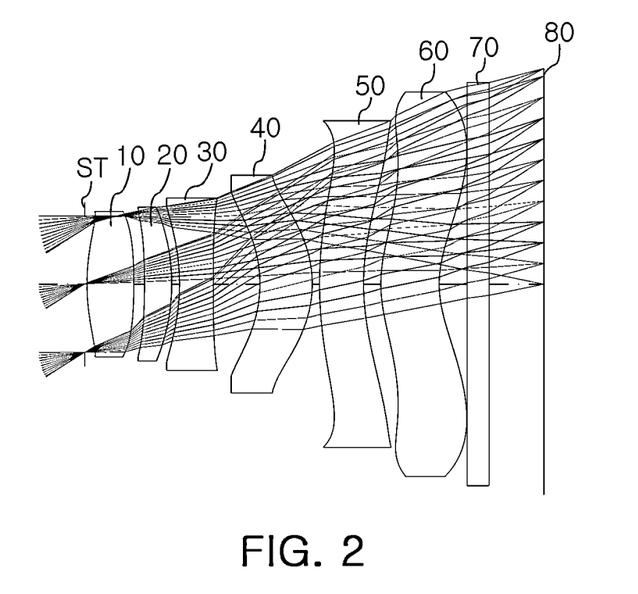
FIG. 2 is a configuration diagram of an optical system according to a second exemplary embodiment of the present disclosure.

An optical system according to a second exemplary embodiment of the present disclosure will be described with reference to FIG. 2.

An optical system according to a second exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 5, a distance (OAL) from a first surface of the first lens 10 to a first surface (imaging surface) of the image sensor 80 may be 6.24 mm, and a distance (BFL) from an image-side surface of the sixth lens 60 to the imaging surface may be 1.42951 mm. In addition, a focal length of the first lens 10 may be 3.85605 mm, a focal length of the second lens 20 may be 7.33396 mm, a focal length of the third lens 30 may be −4.4621 mm, a focal length of the fourth lens 40 may be 12.9796 mm, a focal length of the fifth lens 50 may be −16.555 mm, a focal length of the sixth lens 60 may be −59.668 mm, an overall focal length of the optical system may be 4.66665 mm.

TABLE 5

| | |
|---|---|
| f | 4.66665 |
| f1 | 3.85605 |
| f2 | 7.33396 |
| f3 | −4.4621 |
| f4 | 12.9796 |
| f5 | −16.555 |
| f6 | −59.668 |
| abbe1 | 56.1138 |
| abbe2 | 56.1138 |
| abbe3 | 25.5917 |
| abbe4 | 56.1138 |
| abbe5 | 56.1138 |

TABLE 5-continued

| | |
|---|---|
| abbe6 | 56.1138 |
| OAL | 6.24 |
| BFL | 1.42951 |

Other characteristics of lenses (radii of curvature of lenses, thicknesses of lenses, distances between lenses, refractive indices of lenses, abbe numbers of lenses) are shown in Table 6.

TABLE 6

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9451 | 0.640 | 1.547 | 56.1 |
| 3 | −6.8391 | 0.145 | | |
| 4 | −9.4831 | 0.371 | 1.547 | 56.1 |
| 5 | −2.8562 | 0.107 | | |
| 6 | −2.8396 | 0.462 | 1.620 | 25.6 |
| 7 | 113.4994 | 0.636 | | |
| 8 | −1.8043 | 0.714 | 1.547 | 56.1 |
| 9 | −1.6396 | 0.100 | | |
| 10 | 5.4334 | 0.602 | 1.547 | 56 1 |
| 11 | 3.2618 | 0.235 | | |
| 12 | 1.8425 | 0.797 | 1.547 | 56.1 |
| 13 | 1.4773 | 0.380 | | |
| 14 | Infinity | 0.300 | 1.519 | 64.2 |
| 15 | Infinity | 0.750 | | |
| Image | Infinity | 0.000 | | |

In a second exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 7. That is, all of the second surfaces of the first to sixth lenses 10 to 60 may be aspherical.

TABLE 7

| Surface No. 2 | 2 | 3 | 4 | 5 | 6 | 7 | 8 | 9 | 10 | 11 | 12 | 13 |
|---|---|---|---|---|---|---|---|---|---|---|---|---|
| Y radius | 2.945 | −6.839 | −9.483 | −2.856 | −2.840 | 113.499 | −1.804 | −1.640 | 5.433 | 3.262 | 1.842 | 1.477 |
| Conic Constant (K) | 0.000 | 23.036 | 47.857 | −1.483 | 0.000 | 0.000 | −3.743 | −0.565 | −0.517 | −9.067 | −5.096 | −4.031 |
| 4-th Order Coefficient (A) | −0.027 | −0.034 | −0.018 | −0.019 | 0.027 | 0.035 | −0.085 | −0.024 | −0.004 | −0.002 | −0.072 | −0.052 |
| 6-th Order Coefficient (B) | −0.007 | −0.019 | −0.003 | 0.008 | −0.019 | −0.021 | 0.059 | 0.043 | −0.001 | 0.000 | 0.026 | 0.014 |
| 8-th Order Coefficient (C) | −0.042 | −0.030 | −0.027 | −0.016 | 0.012 | 0.011 | −0.021 | −0.015 | 0.000 | 0.000 | −0.006 | −0.003 |
| 10-th Order Coefficient (D) | 0.035 | 0.024 | 0.025 | 0.018 | 0.007 | −0.002 | 0.009 | 0.007 | 0.000 | 0.000 | 0.001 | 0.000 |
| 12-th Order Coefficient (E) | −0.027 | −0.008 | −0.002 | −0.006 | −0.003 | 0.001 | −0.002 | −0.001 | 0.000 | 0.000 | 0.000 | 0.000 |
| 14-th Order Coefficient (F) | 0.002 | 0.000 | 0.000 | 0.000 | −0.001 | 0.000 | 0.000 | 0.000 | 0.000 | 0.000 | 0.000 | 0.000 |

TABLE 7-continued

| Surface No. 2 | 2 | 3 | 4 | 5 | 6 | 7 | 8 | 9 | 10 | 11 | 12 | 13 |
|---|---|---|---|---|---|---|---|---|---|---|---|---|
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 8 that an optical system according to a second exemplary embodiment of the present disclosure satisfies Conditional Equations 1 to 13 described above. Therefore, optical performance of the lens may be improved.

TABLE 8

| | |
|---|---|
| f1/f | 0.826 |
| v2 − v3 | 30.522 |
| f2/f | 1.572 |
| f3/f | −0.956 |
| f4/f | 2.781 |
| f5/f | −3.547 |
| f6/f | −12.786 |
| OAL/f | 1.337 |
| f1/f2 | 0.526 |
| f2/f3 | −1.644 |
| BFL/f | 0.306 |
| DO | 0.031 |
| r1/f | 0.631 |
| r4/f | −0.612 |

Figure 3:
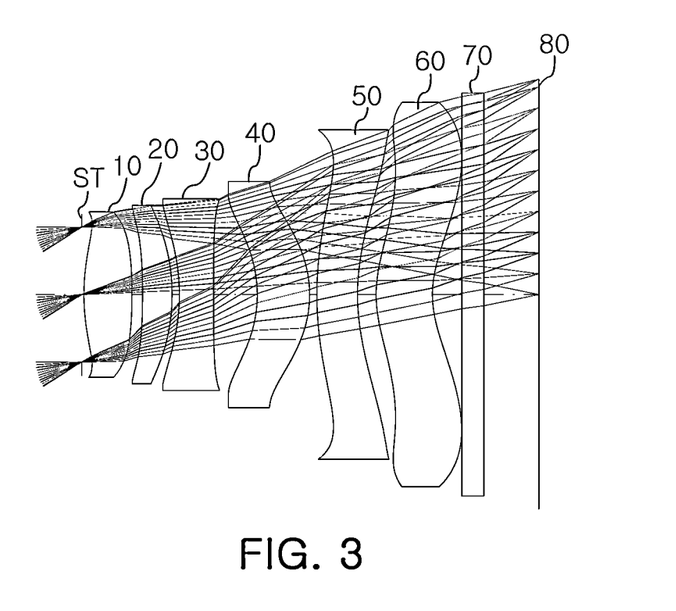
FIG. 3 is a configuration diagram of an optical system according to a third exemplary embodiment of the present disclosure.

An optical system according to a third exemplary embodiment of the present disclosure will be described with reference to FIG. 3.

An optical system according to a third exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 9, a distance (OAL) from a first surface of the first lens 10 to a first surface (imaging surface) of the image sensor 80 may be 6.20491 mm, and a distance (BFL) from an image-side surface of the sixth lens 60 to the imaging surface may be 1.45177 mm. In addition, a focal length of the first lens 10 may be 3.85934 mm, a focal length of the second lens 20 may be 7.19075 mm, a focal length of the third lens 30 may be −4.4903 mm, a focal length of the fourth lens 40 may be 13.0692 mm, a focal length of the fifth lens 50 may be −16.427 mm, a focal length of the sixth lens 60 may be −107.58 mm, an overall focal length of the optical system may be 4.5898 mm.

TABLE 9

| | |
|---|---|
| f | 4.5898 |
| f1 | 3.85934 |
| f2 | 7.19075 |
| f3 | −4.4903 |
| f4 | 13.0692 |
| f5 | −16.427 |
| f6 | −107.58 |
| abbe1 | 56.1138 |
| abbe2 | 56.1138 |
| abbe3 | 25.5917 |
| abbe4 | 56.1138 |
| abbe5 | 56.1138 |
| abbe6 | 56.1138 |
| OAL | 6.20491 |
| BFL | 1.45177 |

Other characteristics of lenses (radii of curvature of lenses, thicknesses of lenses, distances between lenses, refractive indices of lenses, abbe numbers of lenses) are shown in Table 10.

TABLE 10

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9914 | 0.656 | 1.547 | 56.1 |
| 3 | −6.5971 | 0.144 | | |
| 4 | −9.0128 | 0.402 | 1.547 | 56.1 |
| 5 | −2.7797 | 0.100 | | |
| 6 | −2.7277 | 0.467 | 1.620 | 25.6 |
| 7 | −144.7530 | 0.596 | | |
| 8 | −1.7990 | 0.714 | 1 547 | 56.1 |
| 9 | −1.6385 | 0.100 | | |
| 10 | 4.9044 | 0.554 | 1.547 | 56.1 |
| 11 | 3.0452 | 0.254 | | |
| 12 | 1.7380 | 0.768 | 1.547 | 56.1 |
| 13 | 1.4246 | 0.402 | | |
| 14 | Infinity | 0.300 | 1.519 | 64.2 |
| 15 | Infinity | 0.751 | | |
| Image | Infinity | −0.001 | | |

In a third exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 11. That is, all of the second surfaces of the first to sixth lenses 10 to 60 may be aspherical.

TABLE 11

| Surface No. 3 | 2 | 3 | 4 | 5 | 6 | 7 | 8 | 9 | 10 | 11 | 12 | 13 |
|---|---|---|---|---|---|---|---|---|---|---|---|---|
| Y radius | 2.991 | −6.597 | −9.013 | −2.780 | −2.728 | −144.753 | −1.799 | −1.639 | 4.904 | 3.045 | 1.738 | 1.425 |
| Conic Constant (K) | 0.000 | 22.417 | 48.207 | −1.435 | 0.000 | 0.000 | −3.893 | −0.556 | −0.541 | −7.757 | −4.458 | −3.806 |
| 4-th Order Coefficient (A) | −0.026 | −0.033 | −0.018 | −0.020 | 0.027 | 0.034 | −0.085 | −0.024 | −0.004 | −0.001 | −0.073 | −0.052 |
| 6-th Order Coefficient (B) | −0.006 | −0.019 | −0.006 | 0.007 | −0.018 | −0.021 | 0.060 | 0.043 | −0.002 | 0.000 | 0.026 | 0.014 |
| 8-th Order Coefficient (C) | −0.041 | −0.030 | −0.026 | −0.016 | 0.012 | 0.011 | −0.020 | −0.015 | 0.000 | 0.000 | −0.006 | −0.003 |
| 10-th Order Coefficient (D) | 0.036 | 0.024 | 0.026 | 0.019 | 0.007 | −0.002 | 0.009 | 0.007 | 0.000 | 0.000 | 0.001 | 0.000 |
| 12-th Order Coefficient (E) | −0.026 | −0.008 | −0.002 | −0.006 | −0.003 | 0.001 | −0.002 | −0.001 | 0.000 | 0.000 | 0.000 | 0.000 |
| 14-th Order Coefficient (F) | 0.001 | 0.000 | 0.000 | 0.000 | −0.001 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 12 that an optical system according to a third exemplary embodiment of the present disclosure satisfies Conditional Equations 1 to 13 described above. Therefore, optical performance of the lens may be improved.

TABLE 12

| | |
|---|---|
| f1/f | 0.841 |
| v2 − v3 | 30.522 |
| f2/f | 1.567 |
| f3/f | −0.978 |
| f4/f | 2.847 |
| f5/f | −3.579 |
| f6/f | −23.439 |
| OAL/f | 1.352 |
| f1/f2 | 0.537 |
| f2/f3 | −1.601 |
| BFL/f | 0.316 |
| D1/f | 0.031 |
| r1/f | 0.652 |
| r4/f | −0.606 |

Figure 4:
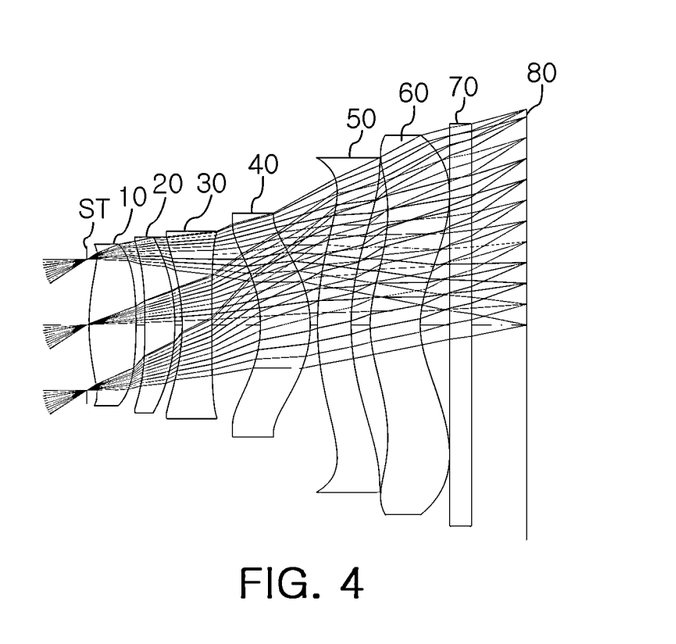
FIG. 4 is a configuration diagram of an optical system according to a fourth exemplary embodiment of the present disclosure.

An optical system according to a fourth exemplary embodiment of the present disclosure will be described with reference to FIG. 4.

An optical system according to a fourth exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 13, a distance (OAL) from a first surface of the first lens 10 to a first surface (imaging surface) of the image sensor 80 may be 5.97 mm, and a distance (BFL) from an image-side surface of the sixth lens 60 to the imaging surface may be 1.45268 mm. In addition, a focal length of the first lens 10 may be 3.8346 mm, a focal length of the second lens 20 may be 7.18763 mm, a focal length of the third lens 30 may be −4.6043 mm, a focal length of the fourth lens 40 may be 14.4975 mm, a focal length of the fifth lens 50 may be −33.339 mm, a focal length of the sixth lens 60 may be −27.872 mm, an overall focal length of the optical system may be 4.45053 mm.

TABLE 13

| | |
|---|---|
| f | 4.45053 |
| f1 | 3.8346 |
| f2 | 7.18763 |
| f3 | −4.6043 |
| f4 | 14.4975 |
| f5 | −33.339 |
| f6 | −27.872 |
| abbe1 | 56.1138 |
| abbe2 | 56.1138 |
| abbe3 | 25.5917 |

TABLE 13-continued

| | |
|---|---|
| abbe4 | 56.1138 |
| abbe5 | 56.1138 |
| abbe6 | 56.1138 |
| OAL | 5.97 |
| BFL | 1.45268 |

Other characteristics of lenses (radii of curvature of lenses, thicknesses of lenses, distances between lenses, refractive indices of lenses, abbe numbers of lenses) are shown in Table 14.

TABLE 14

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9748 | 0.641 | 1.547 | 56.1 |
| 3 | −6.5505 | 0.122 | | |
| 4 | −8.9024 | 0.407 | 1.547 | 56.1 |
| 5 | −2.7695 | 0.100 | | |
| 6 | −2.7861 | 0.406 | 1.620 | 25.6 |
| 7 | −123.3492 | 0.662 | | |
| 8 | −1.7683 | 0.678 | 1.547 | 56.1 |
| 9 | −1.6417 | 0.100 | | |
| 10 | 4.0850 | 0.458 | 1.547 | 56.1 |
| 11 | 3.2046 | 0.260 | | |
| 12 | 1.7027 | 0.682 | 1.547 | 56.1 |
| 13 | 1.3148 | 0.403 | | |
| 14 | Infinity | 0.300 | 1.519 | 64.2 |
| 15 | Infinity | 0.754 | | |
| Image | Infinity | −0.004 | | |

In a fourth exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 15. That is, all of the second surfaces of the first to sixth lenses 10 to 60 may be aspherical.

TABLE 15

| Surface No. 4 | 2 | 3 | 4 | 5 | 6 | 7 | 8 | 9 | 10 | 11 | 12 | 13 |
|---|---|---|---|---|---|---|---|---|---|---|---|---|
| Y radius | 2.975 | −6.551 | −8.902 | −2.770 | −2.786 | −123.349 | −1.768 | −1.642 | 4.085 | 3.205 | 1.703 | 1.315 |
| Conic Constant (K) | 0.000 | 23.455 | 48.956 | −1.334 | 0.000 | 0.000 | −4.450 | −0.592 | −1.344 | −4.858 | −4.645 | −3.752 |
| 4-th Order Coefficient (A) | −0.028 | −0.036 | −0.018 | −0.020 | 0.026 | 0.035 | −0.084 | −0.022 | −0.004 | −0.001 | −0.076 | −0.054 |
| 6-th Order Coefficient (B) | −0.008 | −0.020 | −0.006 | 0.006 | −0.019 | −0.021 | 0.061 | 0.044 | −0.002 | −0.001 | 0.026 | 0.014 |
| 8-th Order Coefficient (C) | −0.042 | −0.030 | −0.027 | −0.017 | 0.013 | 0.011 | −0.020 | −0.015 | 0.000 | 0.000 | −0.006 | −0.003 |
| 10-th Order Coefficient (D) | 0.035 | 0.024 | 0.026 | 0.019 | 0.007 | −0.002 | 0.009 | 0.007 | 0.000 | 0.000 | 0.001 | 0.000 |
| 12-th Order Coefficient (E) | −0.027 | −0.008 | −0.002 | −0.006 | −0.003 | 0.001 | −0.002 | −0.001 | 0.000 | 0.000 | 0.000 | 0.000 |
| 14-th Order Coefficient (F) | 0.001 | 0.000 | 0.000 | 0.000 | −0.001 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 16 that an optical system according to a fourth exemplary embodiment of the present disclosure satisfies Conditional Equations 1 to 13 described above. Therefore, optical performance of the lens may be improved.

TABLE 16

| | |
|---|---|
| f1/f | 0.862 |
| v2-v3 | 30.522 |
| f2/f | 1.615 |
| f3/f | −1.035 |
| f4/f | 3.257 |
| f5/f | −7.491 |
| f6/f | −6.263 |
| OAL/f | 1.341 |
| f1/f2 | 0.534 |
| f2/f3 | −1.561 |
| BFL/f | 0.326 |
| D1/f | 0.027 |
| r1/f | 0.668 |
| r4/f | −0.622 |

Figure 5:
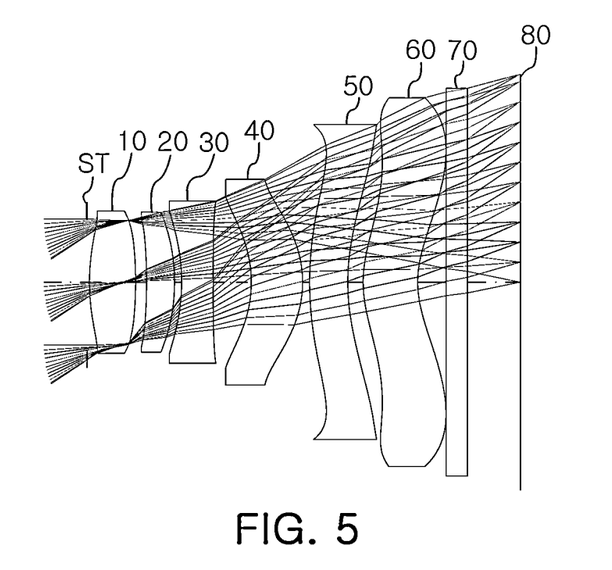
FIG. 5 is a configuration diagram of an optical system according to a fifth exemplary embodiment of the present disclosure.

An optical system according to a fifth exemplary embodiment of the present disclosure will be described with reference to FIG. 5.

An optical system according to a fifth exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 17, a distance (OAL) from a first surface of the first lens 10 to a first surface (imaging surface) of the image sensor 80 may be 6.10362 mm, and a distance (BFL) from an image-side surface of the sixth lens 60 to the imaging surface may be 1.45486 mm. In addition, a focal length of the first lens 10 may be 3.87953 mm, a focal length of the second lens 20 may be 6.91968 mm, a focal length of the third lens 30 may be −4.4607 mm, a focal length of the fourth lens 40 may be 13.2566 mm, a focal length of the fifth lens 50 may be −17.591 mm, a focal length of the sixth lens 60 may be −4547.3 mm, an overall focal length of the optical system may be 4.43963 mm.

TABLE 17

| | |
|---|---|
| f | 4.43963 |
| f1 | 3.87953 |
| f2 | 6.91968 |
| f3 | −4.4607 |
| f4 | 13.2566 |
| f5 | −17.591 |
| f6 | −4547.3 |
| abbe1 | 56.1138 |
| abbe2 | 56.1138 |
| abbe3 | 25.5917 |

TABLE 17-continued

| | |
|---|---|
| abbe4 | 56.1138 |
| abbe5 | 56.1138 |
| abbe6 | 56.1138 |
| OAL | 6.10362 |
| BFL | 1.45486 |

Other characteristics of lenses (radii of curvature of lenses, thicknesses of lenses, distances between lenses, refractive indices of lenses, abbe numbers of lenses) are shown in Table 18.

TABLE 18

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9776 | 0.653 | 1.547 | 56.1 |
| 3 | −6.7918 | 0.155 | | |
| 4 | −9.4028 | 0.398 | 1.547 | 56.1 |
| 5 | −2.7372 | 0.100 | | |
| 6 | −2.6918 | 0.448 | 1.620 | 25.6 |
| 7 | −107.9531 | 0.539 | | |
| 8 | −1.7820 | 0.726 | 1.547 | 56.1 |
| 9 | −1.6362 | 0.100 | | |
| 10 | 4.7577 | 0.540 | 1.547 | 56.1 |
| 11 | 3.0549 | 0.218 | | |
| 12 | 1.7245 | 0.772 | 1.547 | 56.1 |
| 13 | 1.4507 | 0.405 | | |
| 14 | Infinity | 0.300 | 1.519 | 64.2 |
| 15 | Infinity | 0.751 | | |
| Image | Infinity | −0.001 | | |

In a fifth exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 19. That is, all of the second surfaces of the first to sixth lenses 10 to 60 may be aspherical.

TABLE 19

| Surface No. 5 | 2 | 3 | 4 | 5 | 6 | 7 | 8 | 9 | 10 | 11 | 12 | 13 |
|---|---|---|---|---|---|---|---|---|---|---|---|---|
| Y radius | 2.978 | −6.792 | −9.403 | −2.737 | −2.692 | −107.953 | −1.782 | −1.636 | 4.758 | 3.055 | 1.725 | 1.451 |
| Conic Constant (K) | 0.000 | 22.034 | 47.548 | −1.413 | 0.000 | 0.000 | −3.970 | −0.554 | −0.601 | −8.349 | −4.304 | −3.661 |
| 4-th Order Coefficient (A) | −0.026 | −0.033 | −0.018 | −0.020 | 0.027 | 0.035 | −0.084 | −0.024 | −0.004 | 0.000 | −0.073 | −0.053 |
| 6-th Order Coefficient (B) | −0.006 | −0.018 | −0.005 | 0.007 | −0.018 | −0.021 | 0.060 | 0.043 | −0.002 | 0.000 | 0.026 | 0.015 |
| 8-th Order Coefficient (C) | −0.041 | −0.029 | −0.026 | −0.016 | 0.013 | 0.011 | −0.020 | −0.015 | 0.000 | 0.000 | −0.006 | −0.003 |
| 10-th Order Coefficient (D) | 0.036 | 0.024 | 0.026 | 0.019 | 0.007 | −0.002 | 0.009 | 0.007 | 0.000 | 0.000 | 0.001 | 0.000 |
| 12-th Order Coefficient (E) | −0.026 | −0.009 | −0.003 | −0.006 | −0.003 | 0.001 | −0.002 | −0.001 | 0.000 | 0.000 | 0.000 | 0.000 |
| 14-th Order Coefficient (F) | 0.001 | 0.000 | 0.000 | 0.000 | −0.001 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 20 that an optical system according to a fifth exemplary embodiment of the present disclosure satisfies Conditional Equations 1 to 13 described above. Therefore, optical performance of the lens may be improved.

TABLE 20

| | |
|---|---|
| f1/f | 0.874 |
| v2-v3 | 30.522 |
| f2/f | 1.559 |
| f3/f | −1.005 |
| f4/f | 2.986 |
| f5/f | −3.962 |
| f6/f | −1024.253 |
| OAL/f | 1.375 |
| f1/f2 | 0.561 |
| f2/f3 | −1.551 |
| BFL/f | 0.328 |
| D1/f | 0.035 |
| r1/f | 0.671 |
| r4/f | −0.617 |

Figure 6:
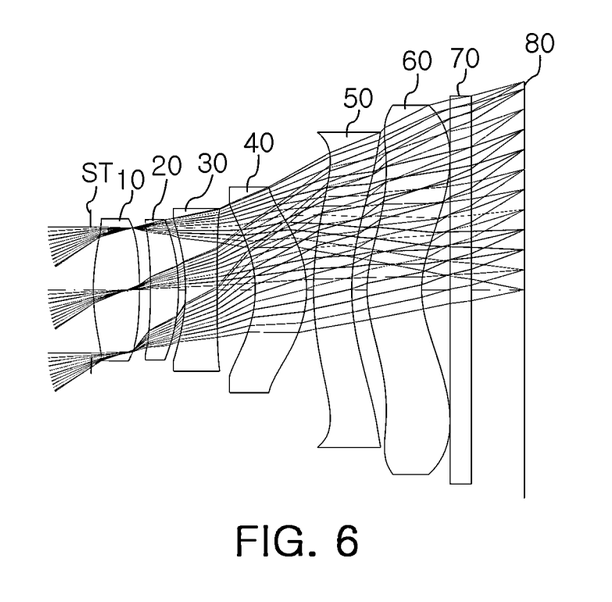
FIG. 6 is a configuration diagram of an optical system according to a sixth exemplary embodiment of the present disclosure.

An optical system according to a sixth exemplary embodiment of the present disclosure will be described with reference to FIG. 6.

An optical system according to a sixth exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 21, a distance (OAL) from a first surface of the first lens 10 to a first surface (imaging surface) of the image sensor 80 may be 6.1024 mm, and a distance (BFL) from an image-side surface of the sixth lens 60 to the imaging surface may be 1.45488 mm. In addition, a focal length of the first lens 10 may be 3.88096 mm, a focal length of the second lens 20 may be 6.91542 mm, a focal length of the third lens 30 may be −4.4639 mm, a focal length of the fourth lens 40 may be 13.2749 mm, a focal length of the fifth lens 50 may be −17.515 mm, a focal length of the sixth lens 60 may be 6182.52 mm, an overall focal length of the optical system may be 4.43837 mm.

TABLE 21

| | |
|---|---|
| f | 4.43837 |
| f1 | 3.88096 |
| f2 | 6.91542 |
| f3 | −4.4639 |
| f4 | 13.2749 |
| f5 | −17.515 |
| f6 | 6182.52 |
| abbe1 | 56.1138 |
| abbe2 | 56.1138 |
| abbe3 | 25.5917 |

TABLE 21-continued

| | |
|---|---|
| abbe4 | 56.1138 |
| abbe5 | 56.1138 |
| abbe6 | 56.1138 |
| OAL | 6.1024 |
| BFL | 1.45488 |

Other characteristics of lenses (radii of curvature of lenses, thicknesses of lenses, distances between lenses, refractive indices of lenses, abbe numbers of lenses) are shown in Table 22.

TABLE 22

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.9776 | 0.653 | 1.547 | 56.1 |
| 3 | −6.8005 | 0.156 | | |
| 4 | −9.4194 | 0.396 | 1.547 | 56.1 |
| 5 | −2.7372 | 0.100 | | |
| 6 | −2.6918 | 0.448 | 1.620 | 25.6 |
| 7 | −105.1805 | 0.539 | | |
| 8 | −1.7811 | 0.726 | 1.547 | 56.1 |
| 9 | −1.6360 | 0.100 | | |
| 10 | 4.7584 | 0.540 | 1.547 | 56.1 |
| 11 | 3.0509 | 0.217 | | |
| 12 | 1.7218 | 0.772 | 1.547 | 56.1 |
| 13 | 1.4497 | 0.405 | | |
| 14 | Infinity | 0.300 | 1.519 | 64.2 |
| 15 | Infinity | 0.751 | | |
| Image | Infinity | −0.001 | | |

In a sixth exemplary embodiment of the present disclosure, the first lens 10 may have positive refractive power, and both surfaces thereof may be convex. The second lens 20 may have positive refractive power, and a first surface thereof may be concave and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be convex and a second surface thereof may be concave. In addition, the fifth lens 50 may have inflection points formed on the first and second surfaces thereof, respectively. The sixth lens 60 may have positive refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 23. That is, all of the second surfaces of the first to sixth lenses 10 to 60 may be aspherical.

TABLE 23

| Surface No. 6 | 2 | 3 | 4 | 5 | 6 | 7 | 8 | 9 | 10 | 11 | 12 | 13 |
|---|---|---|---|---|---|---|---|---|---|---|---|---|
| Y radius | 2.978 | −6.800 | −9.419 | −2.737 | −2.692 | −105.181 | −1.781 | −1.636 | 4.758 | 3.051 | 1.722 | 1.450 |
| Conic Constant (K) | 0.000 | 22.034 | 47.549 | −1.414 | 0.000 | 0.000 | −3.975 | −0.554 | −0.623 | −8.356 | −4.300 | −3.663 |
| 4-th Order Coefficient (A) | −0.026 | −0.033 | −0.018 | −0.020 | 0.027 | 0.035 | −0.084 | −0.024 | −0.004 | 0.000 | −0.073 | −0.053 |
| 6-th Order Coefficient (B) | −0.006 | −0.018 | −0.005 | 0.007 | −0.018 | −0.021 | 0.060 | 0.043 | −0.002 | 0.000 | 0.026 | 0.015 |
| 8-th Order Coefficient (C) | −0.041 | −0.029 | −0.026 | −0.016 | 0.013 | 0.011 | −0.020 | −0.015 | 0.000 | 0.000 | −0.006 | −0.003 |
| 10-th Order Coefficient (D) | 0.036 | 0.024 | 0.026 | 0.019 | 0.007 | −0.002 | 0.009 | 0.007 | 0.000 | 0.000 | 0.001 | 0.000 |
| 12-th Order Coefficient (E) | −0.026 | −0.009 | −0.003 | −0.006 | −0.003 | 0.001 | −0.002 | −0.001 | 0.000 | 0.000 | 0.000 | 0.000 |
| 14-th Order Coefficient (F) | 0.001 | 0.000 | 0.000 | 0.000 | −0.001 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 24 that an optical system according to a sixth exemplary embodiment of the present disclosure satisfies Conditional Equations 1 to 13 described above. Therefore, optical performance of the lens may be improved.

TABLE 24

| | |
|---|---|
| f1/f2 | 0.874 |
| v2-v3 | 30.522 |
| f2/f | 1.558 |
| f3/f | −1.006 |
| f4/f | 2.991 |
| f5/f | −3.946 |
| f6/f | 1392.971 |
| OAL/f | 1.375 |
| f1/f2 | 0.561 |
| f2/f3 | −1.549 |
| BFL/f | 0.328 |
| D1/f | 0.035 |
| r1/f | 0.671 |
| r4/f | −0.617 |

Figure 7:
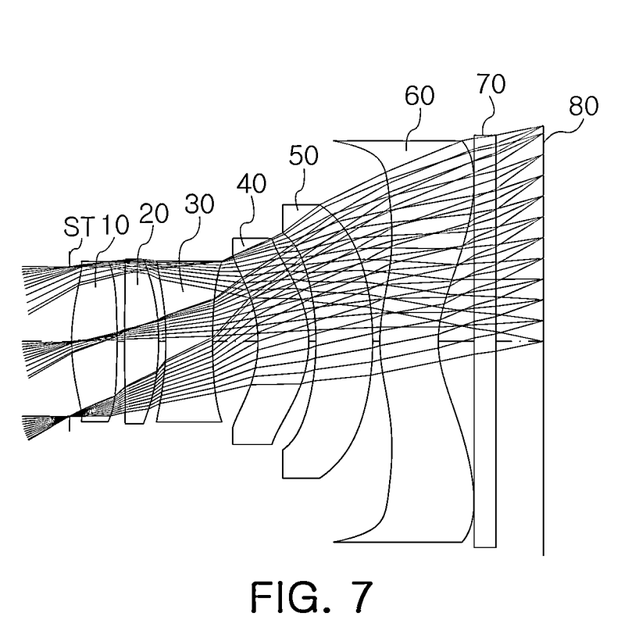
FIG. 7 is a configuration diagram of an optical system according to a seventh exemplary embodiment of the present disclosure.

An optical system according to a seventh exemplary embodiment of the present disclosure will be described with reference to FIG. 7.

An optical system according to a seventh exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 25, a distance (OAL) from a first surface of the first lens 10 to a first surface (imaging surface) of the image sensor 80 may be 6.47 mm, and a distance (BFL) from an image-side surface of the sixth lens 60 to the imaging surface may be 1.44185 mm. In addition, a focal length of the first lens 10 may be 4.56249 mm, a focal length of the second lens 20 may be 5.34804 mm, a focal length of the third lens 30 may be −4.4736 mm, a focal length of the fourth lens 40 may be 13.6989 mm, a focal length of the fifth lens 50 may be −45.613 mm, a focal length of the sixth lens 60 may be −12.266 mm, an overall focal length of the optical system may be 5.03037 mm.

TABLE 25

| | |
|---|---|
| f | 5.03037 |
| f1 | 4.56249 |
| f2 | 5.34804 |
| f3 | −4.4736 |
| f4 | 13.6989 |
| f5 | −45.613 |
| f6 | −12.266 |
| abbe1 | 56.1138 |
| abbe2 | 56.1138 |
| abbe3 | 25.5917 |

TABLE 25-continued

| | |
|---|---|
| abbe4 | 56.1138 |
| abbe5 | 56.1138 |
| abbe6 | 56.1138 |
| OAL | 6.47 |
| BFL | 1.44185 |

Other characteristics of lenses (radii of curvature of lenses, thicknesses of lenses, distances between lenses, refractive indices of lenses, abbe numbers of lenses) are shown in Table 26.

TABLE 26

| Surface No | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.8140 | 0.621 | 1.547 | 56.1 |
| 3 | −20.1782 | 0.103 | | |
| 4 | 16.2086 | 0.470 | 1.547 | 56.1 |
| 5 | −3.5291 | 0.100 | | |
| 6 | −4.1147 | 0.641 | 1.620 | 25.6 |
| 7 | 9.0126 | 0.622 | | |
| 8 | −1.7823 | 0.697 | 1.547 | 56.1 |
| 9 | −1.6384 | 0.100 | | |
| 10 | −3.5019 | 0.776 | 1.547 | 56.1 |
| 11 | −4.3933 | 0.100 | | |
| 12 | 2.2185 | 0.800 | 1.547 | 56.1 |
| 13 | 1.4544 | 0.492 | | |
| 14 | Infinity | 0.300 | 1.519 | 64.2 |
| 15 | Infinity | 0.651 | | |
| Image | Infinity | −0.001 | | |

In a seventh exemplary embodiment of the present disclosure, the first lens 10 may have positive refractive power, and both surfaces thereof may be convex. The second lens 20 may have positive refractive power, and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be concave and a second surface thereof may be convex. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 27. That is, all of the second surfaces of the first to sixth lenses 10 to 60 may be aspherical.

TABLE 27

| Surface No. 7 | 2 | 3 | 4 | 5 | 6 | 7 | 8 | 9 | 10 | 11 | 12 | 13 |
|---|---|---|---|---|---|---|---|---|---|---|---|---|
| Y radius | 2.814 | −20.178 | 16.209 | −3.529 | −4.115 | 9.013 | −1.782 | −1.638 | −3.502 | −4.393 | 2.218 | 1.454 |
| Conic Constant (K) | 0.000 | 11.416 | 0.000 | −1.008 | 0.000 | 0.000 | −4.538 | −0.655 | 0.000 | 0.000 | −5.025 | −3.486 |
| 4-th Order Coefficient (A) | −0.026 | −0.033 | −0.017 | −0.023 | 0.020 | 0.045 | −0.094 | −0.018 | 0.011 | −0.013 | −0.080 | −0.050 |
| 6-th Order Coefficient (B) | −0.003 | −0.014 | 0.000 | 0.003 | −0.020 | −0.017 | 0.059 | 0.043 | −0.008 | −0.001 | 0.027 | 0.015 |
| 8-th Order Coefficient (C) | −0.039 | −0.027 | −0.025 | −0.015 | 0.010 | 0.010 | −0.018 | −0.017 | −0.002 | 0.000 | −0.006 | −0.003 |
| 10-th Order Coefficient (D) | 0.036 | 0.025 | 0.026 | 0.019 | 0.006 | −0.002 | 0.010 | 0.006 | 0.000 | 0.000 | 0.001 | 0.000 |
| 12-th Order Coefficient (E) | −0.025 | −0.008 | −0.003 | −0.006 | −0.003 | 0.002 | −0.002 | −0.001 | 0.000 | 0.000 | 0.000 | 0.000 |
| 14-th Order Coefficient (F) | 0.006 | 0.000 | −0.001 | 0.000 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 28 that an optical system according to a seventh exemplary embodiment of the present disclosure satisfies Conditional Equations 1 to 13 described above. Therefore, optical performance of the lens may be improved.

TABLE 28

| | |
|---|---|
| f1/f | 0.907 |
| v2-v3 | 30.522 |
| f2/f | 1.063 |
| f3/f | −0.889 |
| f4/f | 2.723 |
| f5/f | −9.067 |
| f6/f | −2.438 |
| OAL/f | 1.286 |
| f1/f2 | 20.853 |
| f2/f3 | −1.195 |
| BFL/f | 0.287 |
| D1/f | 0.020 |
| r1/f | 0.559 |
| r4/f | −0.702 |

Figure 8:
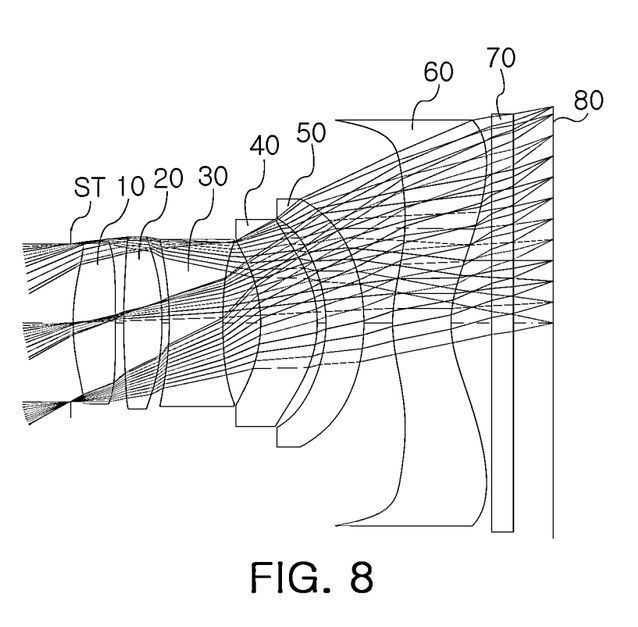
FIG. 8 is a configuration diagram of an optical system according to an eighth exemplary embodiment of the present disclosure.

An optical system according to an eighth exemplary embodiment of the present disclosure will be described with reference to FIG. 8.

An optical system according to an eighth exemplary embodiment of the present disclosure may include a first lens 10, a second lens 20, a third lens 30, a fourth lens 40, a fifth lens 50, and a sixth lens 60, and may further include an infrared cut-off filter 70, an image sensor 80, and a stop ST.

Here, as shown in Table 29, a distance (OAL) from a first surface of the first lens 10 to a first surface (imaging surface) of the image sensor 80 may be 6.58701 mm, and a distance (BFL) from an image-side surface of the sixth lens 60 to the imaging surface may be 1.40308 mm. In addition, a focal length of the first lens 10 may be 5.01632 mm, a focal length of the second lens 20 may be 4.97111 mm, a focal length of the third lens 30 may be −4.311 mm, a focal length of the fourth lens 40 may be 8.74698 mm, a focal length of the fifth lens 50 may be −14.576 mm, a focal length of the sixth lens 60 may be −15.839 mm, an overall focal length of the optical system may be 5.18292 mm.

TABLE 29

| | |
|---|---|
| f | 5.18292 |
| f1 | 5.01632 |
| f2 | 4.97111 |
| f3 | −4.311 |
| f4 | 8.74698 |
| f5 | −14.576 |
| f6 | −15.839 |
| abbe1 | 56.1138 |
| abbe2 | 56.1138 |
| abbe3 | 25.5917 |

TABLE 29-continued

| | |
|---|---|
| abbe4 | 56.1138 |
| abbe5 | 56.1138 |
| abbe6 | 56.1138 |
| OAL | 6.58701 |
| BFL | 1.40308 |

Other characteristics of lenses (radii of curvature of lenses, thicknesses of lenses, distances between lenses, refractive indices of lenses, abbe numbers of lenses) are shown in Table 30.

TABLE 30

| Surface No. | Radius of Curvature | Thickness or Distance | Refractive Index | Abbe Number |
|---|---|---|---|---|
| Object | Infinity | Infinity | | |
| 1 | Infinity | 0.030 | | |
| 2 | 2.8129 | 0.582 | 1.547 | 56.1 |
| 3 | −100.0000 | 0.112 | | |
| 4 | 9.0359 | 0.526 | 1.547 | 56.1 |
| 5 | −3.8048 | 0.100 | | |
| 6 | −4.5721 | 0.736 | 1.620 | 25.6 |
| 7 | 6.8279 | 0.518 | | |
| 8 | −1.9263 | 0.777 | 1.547 | 56.1 |
| 9 | −1.5686 | 0.119 | | |
| 10 | −1.9306 | 0.520 | 1.547 | 56.1 |
| 11 | −2.7908 | 0.395 | | |
| 12 | 2.1374 | 0.800 | 1.547 | 56.1 |
| 13 | 1.4874 | 0.556 | | |
| 14 | Infinity | 0.300 | 1.519 | 64.2 |
| 15 | Infinity | 0.548 | | |
| Image | Infinity | −0.001 | | |

In an eighth exemplary embodiment of the present disclosure, the first lens 10 may have positive refractive power, and both surfaces thereof may be convex. The second lens 20 may have positive refractive power, and a second surface thereof may be convex. The third lens 30 may have negative refractive power, and a first surface thereof may be concave. The fourth lens 40 may have positive refractive power and may have a meniscus shape convex toward the imaging surface. The fifth lens 50 may have negative refractive power, and a first surface thereof may be concave and a second surface thereof may be convex. The sixth lens 60 may have negative refractive power, and a first surface thereof may be convex and a second surface thereof may be concave. In addition, the sixth lens 60 may have inflection points formed on the first and second surfaces thereof, respectively. In addition, the stop ST may be disposed in front of the first lens 10.

Meanwhile, the respective surfaces of the first to sixth lenses 10 to 60 may have aspherical constants as shown in Table 31. That is, all of the second surfaces of the first to sixth lenses 10 to 60 may be aspherical.

TABLE 31

| Surface No. 8 | 2 | 3 | 4 | 5 | 6 | 7 | 8 | 9 | 10 | 11 | 12 | 13 |
|---|---|---|---|---|---|---|---|---|---|---|---|---|
| Y radius | 2.813 | −100.000 | 9.036 | −3.805 | −4.572 | 6.828 | −1.926 | −1.569 | −1.931 | −2.791 | 2.137 | 1.487 |
| Conic Constant (K) | 0.000 | 0.000 | 0.000 | −1.024 | 0.000 | 0.000 | −4.751 | −0.640 | 0.000 | 0.000 | −3.986 | −3.408 |
| 4-th Order Coefficient (A) | −0.025 | −0.033 | −0.016 | −0.023 | 0.018 | 0.049 | −0.102 | −0.018 | 0.030 | −0.019 | −0.088 | −0.050 |
| 6-th Order Coefficient (B) | −0.002 | −0.012 | 0.001 | 0.001 | −0.021 | −0.012 | 0.056 | 0.043 | −0.008 | −0.001 | 0.028 | 0.015 |
| 8-th Order Coefficient (C) | −0.039 | −0.026 | −0.025 | −0.015 | 0.009 | 0.008 | −0.018 | −0.017 | −0.002 | −0.001 | −0.006 | −0.003 |
| 10-th Order Coefficient (D) | 0.036 | 0.025 | 0.026 | 0.019 | 0.006 | −0.003 | 0.010 | 0.006 | 0.000 | 0.000 | 0.001 | 0.000 |
| 12-th Order Coefficient (E) | −0.025 | −0.008 | −0.003 | −0.006 | −0.003 | 0.002 | −0.002 | −0.001 | 0.000 | 0.000 | 0.000 | 0.000 |
| 14-th Order Coefficient (F) | 0.007 | 0.001 | −0.001 | 0.001 | 0.000 | 0.000 | 0.000 | 0.000 | 0.000 | 0.000 | 0.000 | 0.000 |
| 16-th Order Coefficient (G) | 0.000 | 0.000 | 0.000 | 0.000 | 0.000 | 0.000 | 0.000 | 0.000 | 0.000 | 0.000 | 0.000 | 0.000 |
| 18-th Order Coefficient (H) | 0.000 | 0.000 | 0.000 | 0.000 | 0.000 | 0.000 | 0.000 | 0.000 | 0.000 | 0.000 | 0.000 | 0.000 |
| 20-th Order Coefficient (J) | 0.000 | 0.000 | 0.000 | 0.000 | 0.000 | 0.000 | 0.000 | 0.000 | 0.000 | 0.000 | 0.000 | 0.000 |

Meanwhile, it may be appreciated from Table 32 that an optical system according to an eighth exemplary embodiment of the present disclosure satisfies Conditional Equations 1 to 13 described above. Therefore, optical performance of the lens may be improved.

TABLE 32

| | |
|---|---|
| f1/f | 0.968 |
| v2−v3 | 30.522 |
| f2/f | 0.959 |
| f3/f | −0.832 |
| f4/f | 1.688 |
| f5/f | −2.812 |
| f6/f | −3.056 |
| OAL/f | 1.271 |
| f1/f2 | 1.009 |
| f2/f3 | −1.153 |
| BFL/f | 0.271 |
| D1/f | 0.022 |
| r1/f | 0.543 |
| r4/f | −0.734 |

As set forth above, according to an exemplary embodiment of the present disclosure, an aberration improvement effect may be improved, high resolution may be implemented, and sensitivity of lenses may be improved.

While exemplary embodiments have been shown and described above, it will be apparent to those skilled in the art that modifications and variations could be made without departing from the spirit and scope of the present disclosure as defined by the appended claims.

What is claimed is:

1. An optical system comprising in order from an object side to an image side: a first lens having positive refractive power; a second lens having positive refractive power; a third lens having negative refractive power; a fourth lens having positive refractive power; a fifth lens having negative refractive power; a sixth lens having positive or negative refractive power, an image-side surface thereof being concave toward an imaging surface,
   wherein an image-side surface of the fifth lens is concave, and
   wherein the first lens, the second lens, the third lens, the fourth lens, the fifth lens, and the sixth lens are sequentially disposed from the object side.

2. The optical system of claim 1, wherein an object-side surface of the first lens is convex toward an object.

3. The optical system of claim 1, wherein an image-side surface of the second lens is convex.

4. The optical system of claim 1, wherein an object-side surface of the third lens is concave.

5. The optical system of claim 1, wherein the fourth lens has a meniscus shape convex toward the imaging surface.

6. The optical system of claim 1, wherein an object-side surface of the fifth lens is convex.

7. The optical system of claim 1, wherein the fifth lens has an inflection point formed on an object-side surface or an image-side surface thereof.

8. The optical system of claim 1, wherein the sixth lens has at least one inflection point formed on the image-side surface thereof.

9. The optical system of claim 1, wherein the first to sixth lenses are formed of plastic.

10. The optical system of claim 1, wherein at least one of an object-side surface and an image-side surface of each of the first to sixth lenses is aspherical.

11. The optical system of claim 1, wherein it satisfies Conditional Equation 1:

$$0.6 < f1/f < 1.1 \quad \text{[Conditional Equation 1]}$$

where f is an overall focal length [mm] of the optical system, and f1 is a focal length [mm] of the first lens.

12. The optical system of claim 1, wherein it satisfies Conditional Equation 2:

$$|v2-v3| > 25 \quad \text{[Conditional Equation 2]}$$

where v2 is an abbe number of the second lens, and v3 is an abbe number of the third lens.

13. The optical system of claim 1, wherein it satisfies Conditional Equation 3:

$$0.8 < f2/f < 2.0 \quad \text{[Conditional Equation 3]}$$

where f2 is a focal length [mm] of the second lens, and f is an overall focal length [mm] of the optical system.

14. The optical system of claim 1, wherein it satisfies Conditional Equation 4:

$$-1.2 < f3/f < -0.6 \quad \text{[Conditional Equation 4]}$$

where f3 is a focal length [mm] of the third lens, and f is an overall focal length [mm] of the optical system.

15. The optical system of claim 1, wherein it satisfies Conditional Equation 5:

$$1 < f4/f < 8 \quad \text{[Conditional Equation 5]}$$

where f4 is a focal length [mm] of the fourth lens, and f is an overall focal length [mm] of the optical system.

16. The optical system of claim 1, wherein it satisfies Conditional Equation 6:

$$-12 < f5/f < -1 \quad \text{[Conditional Equation 6]}$$

where f5 is a focal length [mm] of the fifth lens, and f is an overall focal length [mm] of the optical system.

17. The optical system of claim 1, wherein it satisfies Conditional Equation 7:

$$1.0 < OAL/f < 1.8 \quad \text{[Conditional Equation 7]}$$

where OAL is a distance [mm] from an object-side surface of the first lens to an imaging surface, and f is an overall focal length [mm] of the optical system.

18. The optical system of claim 1, wherein it satisfies Conditional Equation 8:

$$0.2 < f1/f2 < 1.5 \qquad \text{[Conditional Equation 8]}$$

where f1 is a focal length [mm] of the first lens, and f2 is a focal length [mm] of the second lens.

19. The optical system of claim 1, wherein it satisfies Conditional Equation 9:

$$-2.0 > f2/f3 < -0.8 \qquad \text{[Conditional Equation 9]}$$

where f2 is a focal length [mm] of the second lens, and f3 is a focal length [mm] of the third lens.

20. The optical system of claim 1, wherein it satisfies Conditional Equation 10:

$$0.1 < BFL/f < 0.6 \qquad \text{[Conditional Equation 10]}$$

where BFL is a distance [mm] from an image-side surface of the sixth lens to an imaging surface, and f is an overall focal length [mm] of the optical system.

21. The optical system of claim 1, wherein it satisfies Conditional Equation 11:

$$0.0 < D1/f < 0.1 \qquad \text{[Conditional Equation 11]}$$

where D1 is an air interval [mm] between the first and second lenses, and f is an overall focal length [mm] of the optical system.

22. The optical system of claim 1, wherein it satisfies Conditional Equation 12:

$$0.2 < r1/f < 1.0 \qquad \text{[Conditional Equation 12]}$$

where r1 is a radius of curvature [mm] of an object-side surface of the first lens, and f is an overall focal length [mm] of the optical system.

23. The optical system of claim 1, wherein it satisfies Conditional Equation 13:

$$-0.9 < r4/f < -0.1 \qquad \text{[Conditional Equation 13]}$$

where r4 is a radius of curvature [mm] of an image-side surface of the second lens, and f is an overall focal length [mm] of the optical system.

* * * * *